(12) United States Patent
Rosenvard et al.

(10) Patent No.: US 7,944,070 B2
(45) Date of Patent: May 17, 2011

(54) YAW SYSTEM FOR A NACELLE OF A WIND TURBINE AND WIND TURBINE

(75) Inventors: Paw Rosenvard, Gjern (DK); Lars Brink Christensen, Skanderborg (DK)

(73) Assignee: Vestas Wind Systems A/S, Randers SV (DK)

( * ) Notice: Subject to any disclaimer, the term of this patent is extended or adjusted under 35 U.S.C. 154(b) by 0 days.

(21) Appl. No.: 12/861,444

(22) Filed: Aug. 23, 2010

(65) Prior Publication Data

US 2011/0049884 A1 Mar. 3, 2011

Related U.S. Application Data

(60) Provisional application No. 61/236,552, filed on Aug. 25, 2009.

(30) Foreign Application Priority Data

Aug. 25, 2009 (DK) .................. 2009 00954

(51) Int. Cl.
*F03D 9/00* (2006.01)
*H02P 9/04* (2006.01)
*B63H 3/00* (2006.01)
*B64C 11/00* (2006.01)
*B64C 27/00* (2006.01)
*F03B 7/00* (2006.01)
(52) U.S. Cl. ................. 290/44; 290/55; 416/31; 416/32
(58) Field of Classification Search .................. 290/44, 290/55; 416/31, 32; 280/230
See application file for complete search history.

(56) References Cited

U.S. PATENT DOCUMENTS 4,515,525 A * 5/1985 Doman ........................ 416/11
4,557,666 A * 12/1985 Baskin et al. ................ 416/32
4,565,929 A * 1/1986 Baskin et al. ................ 290/44
(Continued)

FOREIGN PATENT DOCUMENTS

DE 103 07 929 9/2004
(Continued)

OTHER PUBLICATIONS

Jens Skou; 1st Technical Examination Report issued in priority Application No. PA 2009 00954; Apr. 9, 2010; 4 pages; Denmark Patent and Trademark Office.

*Primary Examiner* — T. C. Patel
*Assistant Examiner* — Pedro J Cuevas
(74) *Attorney, Agent, or Firm* — Wood, Herron & Evans, L.L.P.

(57) ABSTRACT

A yaw system of a wind turbine includes a plurality of motors, each motor being coupled to the nacelle for applying torque to the nacelle; a plurality of controllers, one controller for each of the motors, each controller being configured to control the respective motor and coupled to at least one other controller to transmit operation information thereto; and a yaw system controller configured to transmit control information to at least one controller of the plurality of controllers. At least one of the controllers is configured to control the respective motor based on at least one of the control information and the received operation information from the at least one other controller. Communication between the controllers of the respective motors can allow a faster response of the yaw system to yaw the nacelle according to a change of wind direction.

19 Claims, 8 Drawing Sheets

U.S. PATENT DOCUMENTS

| | | | | |
|---|---|---|---|---|
| 4,966,525 A * | 10/1990 | Nielsen | | 416/9 |
| 5,035,575 A * | 7/1991 | Nielsen et al. | | 416/9 |
| 6,927,502 B2 * | 8/2005 | Wobben | | 290/44 |
| 6,939,103 B2 * | 9/2005 | Wobben | | 415/155 |
| 6,945,752 B1 * | 9/2005 | Wobben | | 416/170 R |
| 7,190,086 B2 * | 3/2007 | Wobben | | 290/44 |
| 7,288,851 B2 * | 10/2007 | Wobben | | 290/44 |
| 7,347,667 B2 * | 3/2008 | Wobben | | 416/1 |
| 7,436,083 B2 * | 10/2008 | Shibata et al. | | 290/44 |
| 7,717,673 B2 * | 5/2010 | Menke | | 416/1 |
| 2003/0080566 A1 | 5/2003 | Becker et al. | | 290/55 |
| 2003/0160456 A1 | 8/2003 | Wobben | | 290/44 |
| 2004/0081551 A1 | 4/2004 | Wobben | | 415/4.1 |
| 2004/0178642 A1 | 9/2004 | Wobben | | 290/55 |
| 2004/0253093 A1 * | 12/2004 | Shibata et al. | | 415/4.1 |
| 2005/0175451 A1 | 8/2005 | Wobben | | 416/31 |
| 2007/0158926 A1 | 7/2007 | Hahmann | | 280/230 |
| 2007/0267872 A1 * | 11/2007 | Menke | | 290/44 |
| 2008/0084068 A1 * | 4/2008 | Shibata et al. | | 290/44 |
| 2008/0131279 A1 | 6/2008 | Behnke et al. | | 416/26 |
| 2009/0068013 A1 * | 3/2009 | Birkemose et al. | | 416/31 |
| 2010/0080702 A1 * | 4/2010 | Matsuo et al. | | 416/1 |
| 2010/0109327 A1 * | 5/2010 | Nielsen et al. | | 290/44 |
| 2010/0111665 A1 * | 5/2010 | Daniels | | 414/814 |
| 2010/0119370 A1 * | 5/2010 | Myhr | | 416/39 |
| 2010/0140948 A1 * | 6/2010 | Segovia et al. | | 290/55 |
| 2010/0181769 A1 * | 7/2010 | Altemark et al. | | 290/44 |
| 2010/0296932 A1 * | 11/2010 | Yoshida | | 416/147 |
| 2010/0301604 A1 * | 12/2010 | Nielsen et al. | | 290/44 |
| 2010/0301605 A1 * | 12/2010 | Nielsen et al. | | 290/44 |

FOREIGN PATENT DOCUMENTS

| | | |
|---|---|---|
| EP | 0 083 819 | 7/1983 |
| EP | 0 945 613 A2 | 9/1999 |
| EP | 0 945 613 A3 | 9/2000 |
| EP | 2 037 119 | 3/2009 |
| JP | 2008-95664 | 4/2008 |
| WO | 97/22805 | 6/1997 |

* cited by examiner

YAW SYSTEM FOR A NACELLE OF A WIND TURBINE AND WIND TURBINE

CROSS-REFERENCE TO RELATED APPLICATIONS

This application claims priority under 35 U.S.C. §119(a) to Danish Patent Application No. PA 2009 00954, filed on 25 Aug. 2009. This application also claims the benefit of U.S. Provisional Application No. 61/236,552, filed on 25 Aug. 2009. Each of the applications is incorporated by reference herein in its entirety.

TECHNICAL FIELD

The present invention relates generally to a yaw system for a nacelle of a wind turbine and a wind turbine.

BACKGROUND

Wind turbines usually have a yaw system to move a nacelle with respect to a tower of a wind turbine such that rotor blades are moved according to a wind direction. To obtain maximum wind energy capture, the rotor blades are usually moved to face the direction the wind is blowing.

Generally, the conventional yaw systems have one or more motors. However, the conventional yaw systems may have problems of torque fluctuations of the motors. Further, there may also be an unequal distribution of load and torque among a plurality of motors.

Hence, one objective of the present invention is to avoid the above-mentioned problems.

SUMMARY

According to an embodiment, a yaw system for a nacelle of a wind turbine is provided. The yaw system includes a plurality of motors, each motor being coupled to the nacelle for applying torque to the nacelle; a plurality of controllers, wherein the plurality of controllers includes one controller for each motor of the plurality of motors, each controller being configured to control the respective motor and being coupled to at least one other controller to transmit operation information thereto; and a yaw system controller being configured to transmit control information to at least one controller of the plurality of controllers. At least one of the controllers is configured to control the respective motor based on at least one of the control information and the received operation information from the at least one other controller. One effect of this embodiment is that communication between the controllers of the respective motors allows a faster response of the yaw system to yaw the nacelle according to a change of wind direction.

According to an embodiment, the yaw system controller is configured to determine the control information based on at least one of information representing a wind direction and a position of the nacelle, and to transmit the control information to at least one of the controllers.

According to an embodiment, the operation information includes the control information.

According to an embodiment, the operation information includes information about an operational characteristic of the at least one motor.

According to an embodiment, the operation information includes one or more of a group consisting of a torque, a rotational speed and a rotational direction.

According to an embodiment, the yaw system controller is at least one of the controllers.

According to an embodiment, the yaw system controller is a separate unit coupled to at least one of the controllers.

According to an embodiment, the controller of a first motor of the plurality of motors is coupled to the controller of a second motor of the plurality of motors and the controller of the first motor is configured to communicate with the controller of the second motor to receive information about an operational characteristic of the second motor. One effect of this embodiment is that communication between the controllers of the respective motors allows a faster response of the yaw system to yaw the nacelle according to a change of wind direction. A torque applied on the nacelle can be equally shared among the plurality of motors.

According to an embodiment, the controller of the first motor is configured to control the first motor based on the received information.

According to an embodiment, the controller of the second motor is configured to communicate with the controller of the first motor to receive information about an operational characteristic of the first motor and the controller of the second motor is configured to control the second motor based on the received information.

According to an embodiment, the operational characteristic includes one or more of a group consisting of a torque, a rotational speed and a rotational direction.

According to an embodiment, the communication between the controllers is carried out according to packet transmission protocol.

According to an embodiment, the packet transmission protocol includes Internet protocol.

According to an embodiment, each motor includes a variable torque drive.

According to an embodiment, the variable torque drive of each motor includes the controller of the motor.

According to an embodiment, the yaw system controller is configured to, in a first operation mode, control the plurality of motors to apply torque to the nacelle in a first rotation direction or in a second rotation direction simultaneously; and configured to, in a second operation mode, control at least the first motor of the plurality of motors to apply torque to the nacelle in the first rotation direction and to control at least the second motor of the plurality of motors to apply torque to the nacelle in the second rotation direction.

According to an embodiment, in the first operation mode, the yaw system is configured to move the nacelle in the first rotation direction or the second rotation direction such that a rotor with at least one blade coupled to the nacelle is moved according to a wind direction.

According to an embodiment, in the first operation mode, the yaw system is configured to unwind a cable at a rest position of the nacelle.

According to an embodiment, in the second operation mode, the yaw system is configured to generate a braking effect to keep the nacelle at a desired position.

According to an embodiment, each motor is one or more of a group consisting of a direct current motor, a servo motor and a permanent magnet motor.

According to an embodiment, a wind turbine including a yaw system as described above is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Exemplary embodiments of a yaw system for a nacelle of a wind turbine and a wind turbine in accordance with the present invention will be described in detail below with reference to the accompanying figures. It will be appreciated that the exemplary embodiments described below can be modified in various aspects without changing the essence of the invention.

Figure 1:
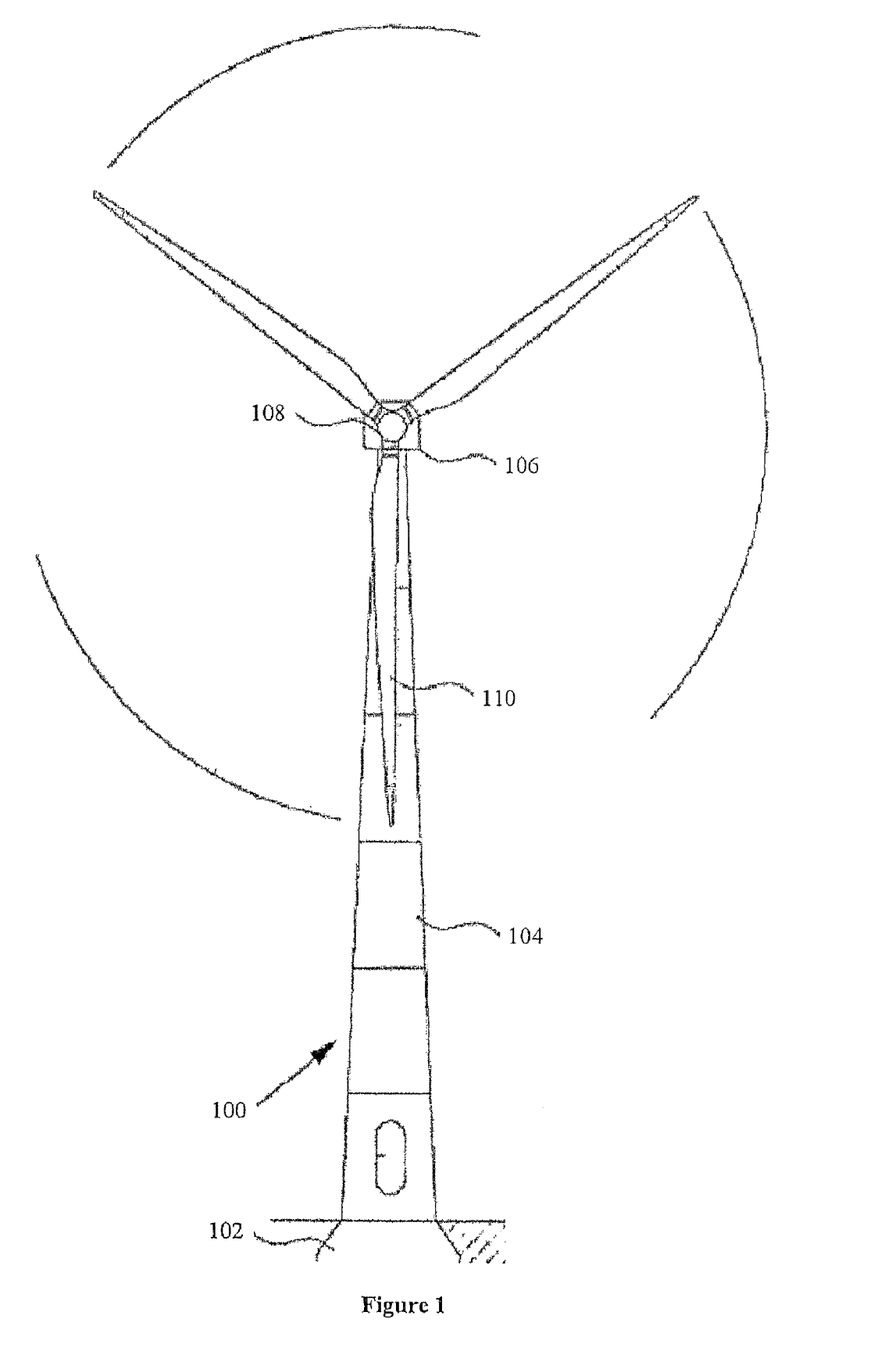
FIG. 1 illustrates a common setup of a conventional wind turbine.

FIG. 1 illustrates a common setup of a conventional wind turbine 100. The wind turbine 100 is mounted on a base 102. The wind turbine 100 includes a tower 104 having a number of tower sections, such as tower rings. A wind turbine nacelle 106 is placed on top of the tower 104. The wind turbine rotor includes a hub 108 and at least one rotor blade 110, e.g., three rotor blades 110. The rotor blades 110 are connected to the hub 108 which in turn is connected to the nacelle 106 through a low speed shaft which extends out of the front of the nacelle 106.

Figure 2A:
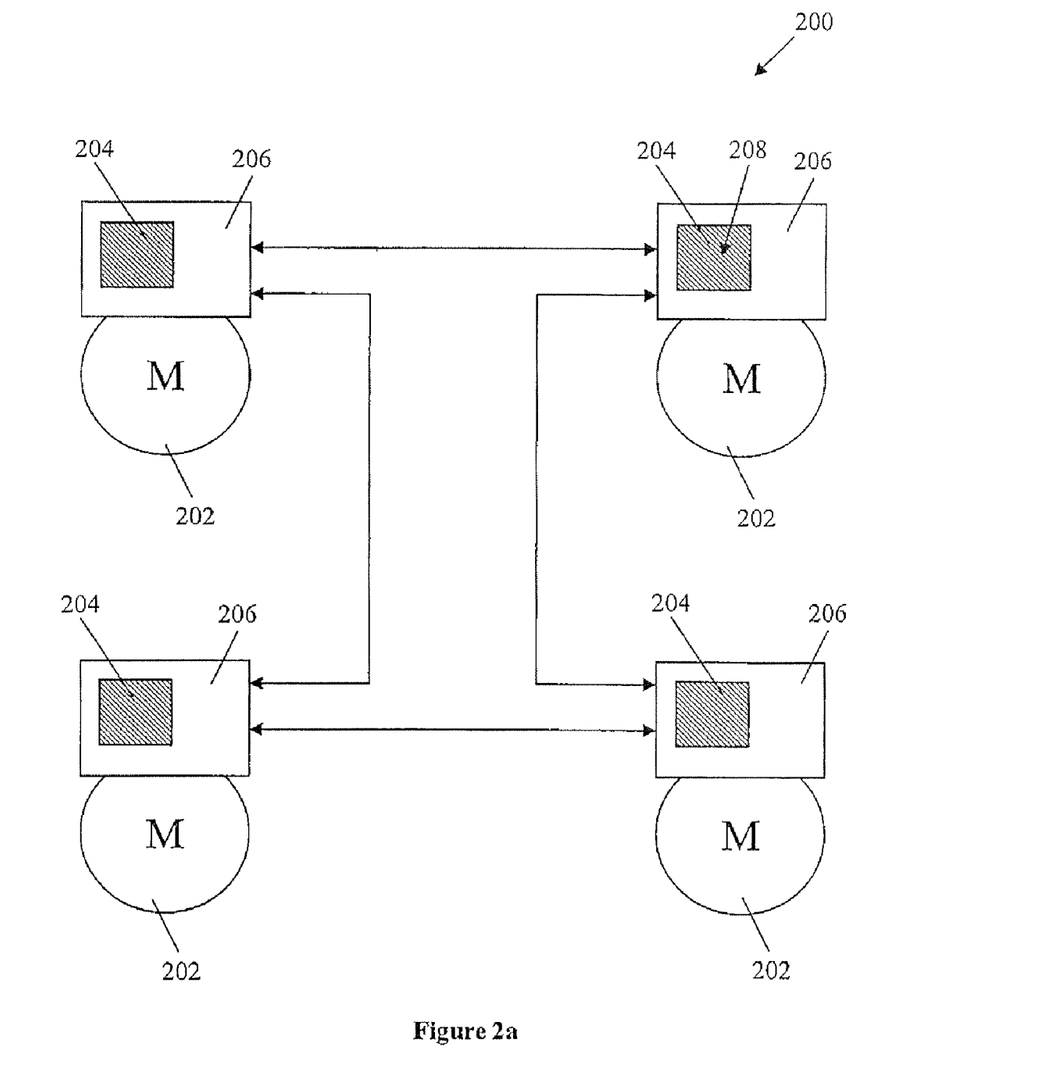
FIG. 2a shows a schematic diagram of one example of a yaw system for a nacelle.

FIG. 2a shows a schematic diagram of a yaw system 200 for the nacelle 106. The yaw system 200 is disposed in the nacelle 106. The yaw system 200 may also be disposed in an upper part of the tower 104 which is near to the nacelle 106. The yaw system 200 is configured to move the nacelle 106 about in a substantially horizontal plane which is substantially perpendicular to the axis of the tower 104. The nacelle 106 can be tilted slightly upwards to prevent the rotor blades 110 from hitting the tower 104. The yaw system 200 moves the nacelle 106 according to the wind direction such that the rotor blades 110 are facing the wind to maximize wind energy capture. The yaw system 200 moves the nacelle 106 in a rotational direction according to the wind direction. Further, a yawing speed of the nacelle 106 may vary according to a change in the wind direction.

In one embodiment, the yaw system 200 has a plurality of motors 202. The yaw system 200 may for example have at least one motor 202. The yaw system 200 may have an even number of motors 202 (e.g. four motors 202). However, it is understood that the yaw system 200 may include only two motors 202. Each motor 202 of the yaw system 200 may be coupled to the nacelle 106 for applying torque to the nacelle 106. Each motor 202 may be but is not limited to a direct current motor, a servo motor or a permanent magnet motor. In one embodiment, the motors 202 apply a torque to the nacelle 106 by turning a common cog wheel, which can be disposed in the nacelle 106 or in the tower 104. The motors 202 may be uniformly distributed around a periphery of the common cog wheel. It is possible for a non-uniform distribution of the motors 202 around the periphery of the common cog wheel.

The yaw system 200 has a plurality of controllers 204. The plurality of controllers 204 may have one controller 204 for each motor 202 of the plurality of motors 202. In short, each motor 202 may have a corresponding controller 204 which is configured to control the motor 202, for example, to apply a certain torque in a certain direction or to rotate with a certain rotation speed in a certain direction. Therefore, each motor 202 can be controlled individually by the corresponding controller 204. The controller 204 of each motor 202 can be coupled to at least one other controller 204 of the plurality of controllers 204. In one embodiment, the controller 204 of one motor 202 may be used to control at least one other motor of the plurality of motors 202.

Each motor 202 may include a variable torque drive 206. The variable torque drive 206 of each motor 202 may include the corresponding controller 204 of the motor 202. Since the controller 204 of each motor 202 is coupled to at least one other controller 204, the variable torque drive 206 of each motor 202 may be coupled to at least one other variable torque drive 206.

The yaw system 200 may also include a yaw system controller 208. In one embodiment, as shown in FIG. 2a, the yaw system controller 208 can be at least one of the controllers 204. In other words, one controller 204 may be used as the yaw system controller 208 instead of having a separate yaw system controller 208 for the yaw system 200. Depending on the number of controllers 204 in the yaw system 200, two or more controllers 204 may be used as the yaw system controller 208. The controllers 204 used as the yaw system controller 208 may communicate with one or more other controllers 204 of the plurality of controllers 204 of the yaw system 200.

Based on the information a controller 204 receives from another controller 204, for example, information about an operational characteristic of the motor 202 controlled by the other controller 204, the controller 204 may control the operation of the motor 202, such as the torque to be applied by the motor 202, the direction in which torque is to be applied by the motor 202. The controller 204 may also evaluate and combine information about a plurality of other controllers 204 and control the operation of the motor 202 based on the result of this evaluation or combination. For example, the controller 204 may calculate a torque to be applied by the motor 202 based on the information about the torques applied by the other motors 202, for example, such that a predetermined overall torque is applied to the nacelle 106.

Figure 2B:
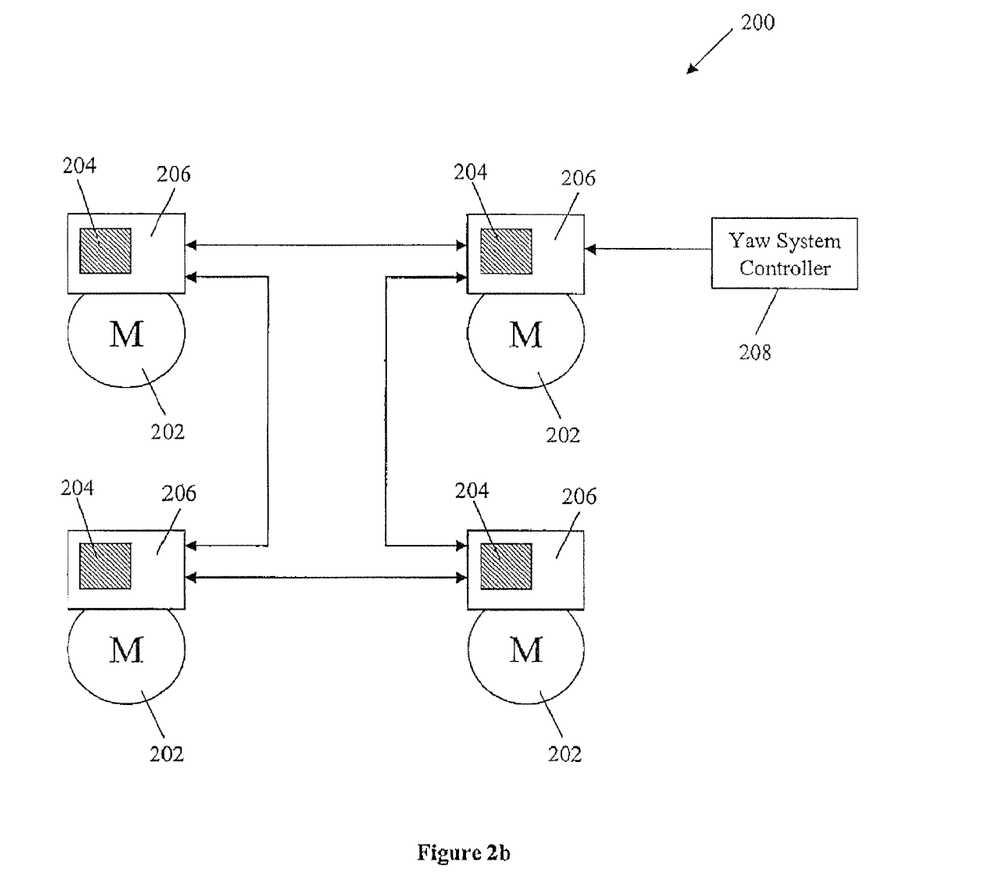
FIG. 2b shows a schematic diagram of another example of a yaw system for a nacelle.

In another embodiment, as shown in FIG. 2b, the yaw system controller 208 may be coupled to at least one of the controllers 204. Since the controllers 204 can be located in the respective variable torque drives 206, the yaw system controller 208 may be coupled to at least one of the variable torque drives 206.

Details of the operation of the yaw system 200 are described in the following.

The yaw system 200 may have more than one operation mode (e.g. a first and a second operation mode). In the first operation mode, the yaw system 200 may move the nacelle 106 in a first rotation direction or a second rotation direction such that the rotor with at least one rotor blade 110 coupled to the nacelle 106 is moved according to the wind direction. Therefore, the yaw system controller 208 may control the plurality of motors 202 to apply torque to the nacelle 106, for example, by means of a cog wheel attached to the nacelle 106 in case that the motors are attached to the tower 104 or by means of a cog wheel attached to the tower 104 in case that the motors 202 are attached to the nacelle 106, in the first rotation direction or in the second rotation direction simultaneously.

Figure 3A:
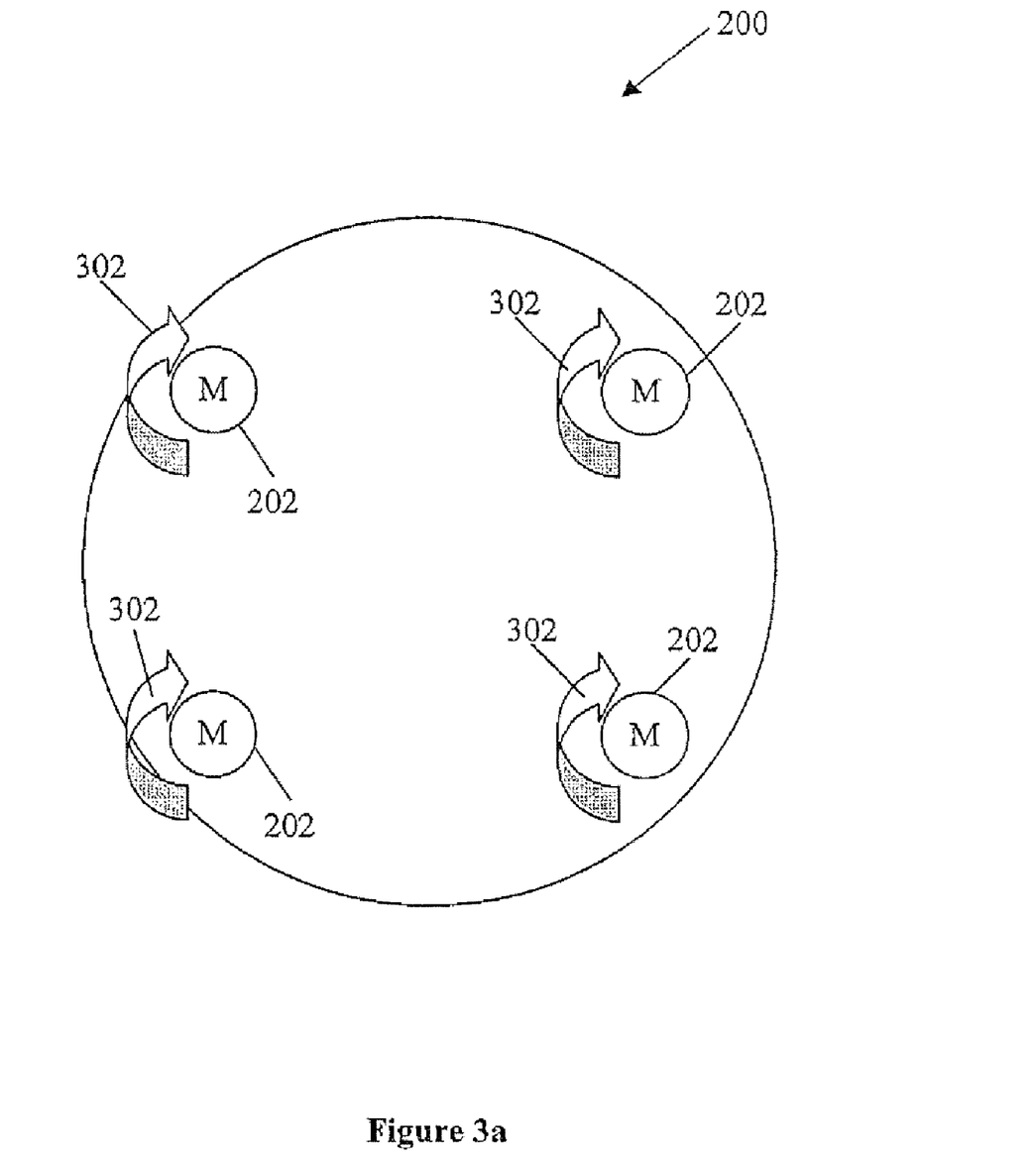
FIG. 3a shows an operation of a plurality of motors applying a torque on a nacelle to yaw the nacelle.

As shown in FIG. 3a, the motors 202 of the yaw system 200 can apply torque to the nacelle 106 in a clockwise direction as indicated by arrows 302. The motors 202 may also apply torque to the nacelle 106 in an anti-clockwise direction. The wind direction may determine the direction in which the motors 202 apply torque to the nacelle 106. For example, the yaw system 200 may receive a measured wind direction from a sensor or a wind vane and control the motors 202 based on the measured wind direction. The motors 202 may apply a low torque to the nacelle 106 until a correct direction of the wind is obtained. Once the correct wind direction is obtained, the motors may apply full torque to the nacelle 106.

Figure 3B:
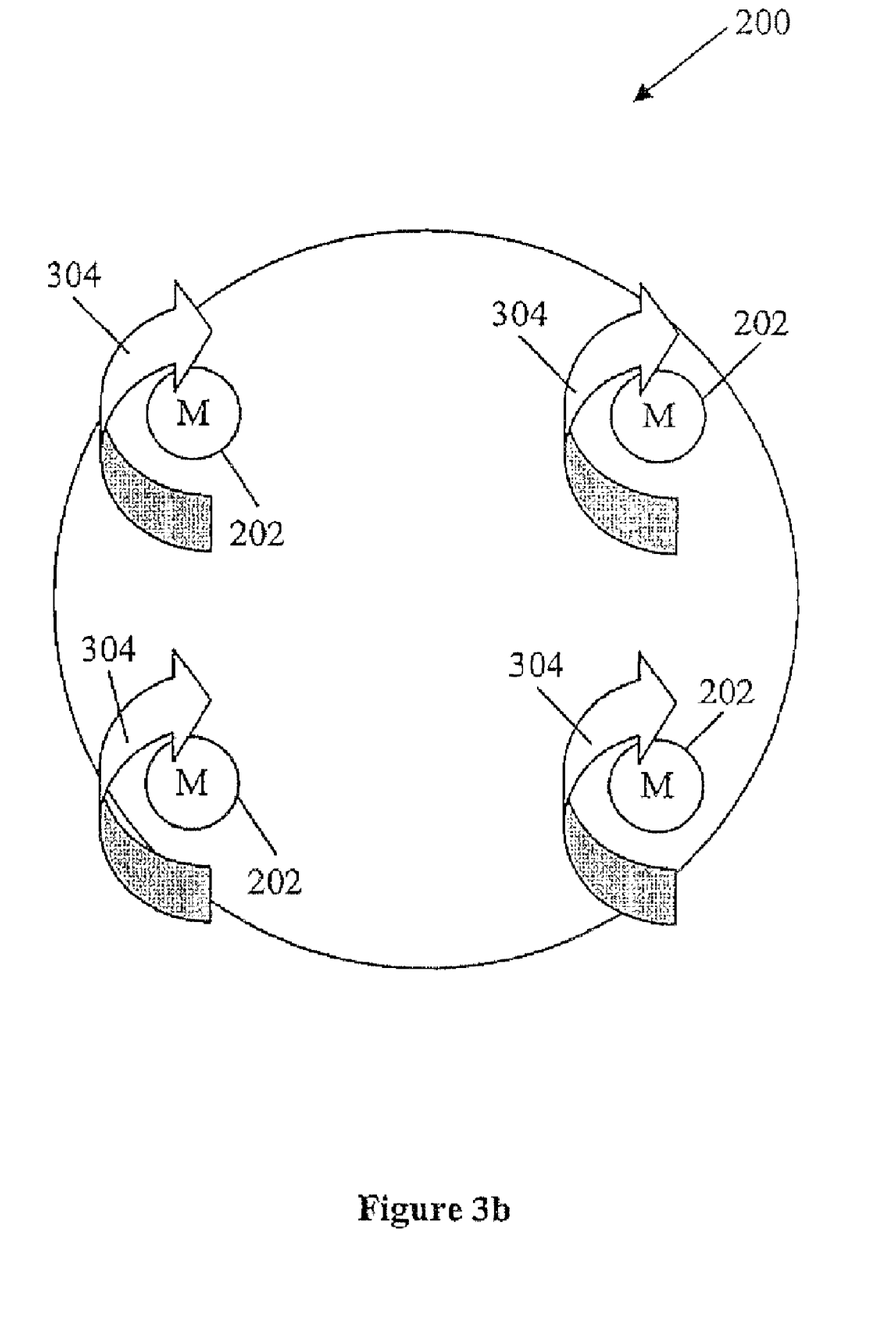
FIG. 3b shows an operation of a plurality of motors to unwind a cable at a rest position of a nacelle.

As the nacelle 106 yaws, at least one cable in the tower 104 twists. Therefore, the yaw system 200 may unwind the cable when the nacelle 106 is at a rest position. As shown in FIG. 3b, the motors 202 can unwind the cable in a clockwise rotation as indicated by arrows 304. The motors 202 may also unwind the cable in an anti-clockwise direction. The direction of unwinding the cable when the nacelle 106 is at the rest position depends on the direction in which the cable was being twisted when the nacelle 106 was yawing.

Figure 3C:
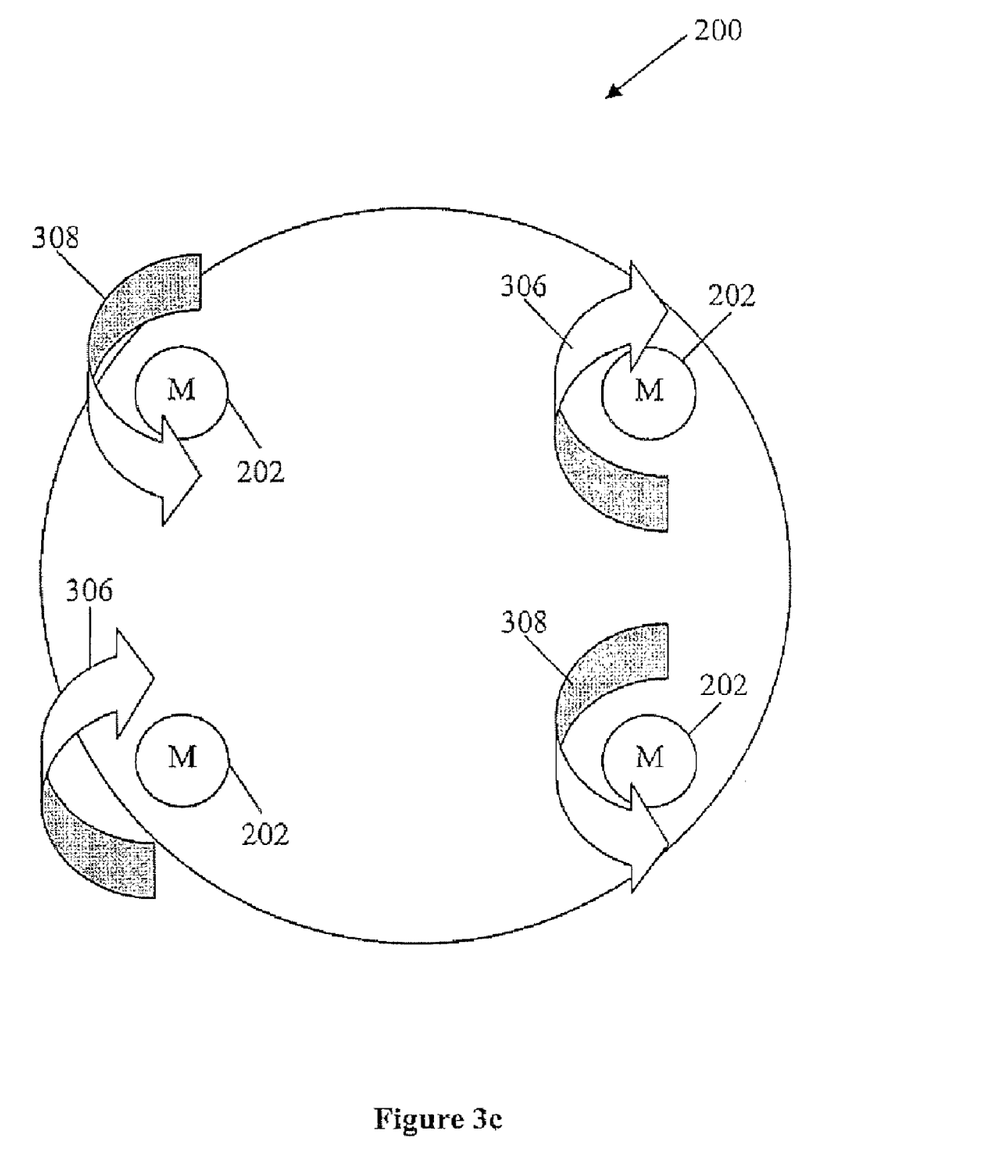
FIG. 3c shows an operation of a plurality of motors applying a braking effect on a nacelle.

In the second operation mode, the yaw system 200 may generate a braking effect to keep the nacelle 106 at a desired position. In the second operation mode, the yaw system controller 208 may control the plurality of motors 202 of the yaw system such that at least a first motor 202 of the plurality of motors 202 applies torque to the nacelle 106 in the first rotation direction and at least a second motor 202 of the plurality of motors 202 applies torque to the nacelle 106 in the second rotation direction. For the yaw system 200 to generate a braking effect on the nacelle 106 more effectively, the yaw system 200 may have an even number of motors 202. Having an even number of motors 202 can allow an equal sharing of the torque applied in the respective directions to the nacelle 106.

As shown in FIG. 3c, the yaw system 200 has, for example, four motors 202. Two motors 202 apply torque to the nacelle 106 in a clockwise direction as indicated by arrows 306, and the other two motors 202 apply torque to the nacelle 106 in an anti-clockwise direction as indicated by arrows 308. This can achieve a braking effect on the nacelle 106 to keep the nacelle 106 at a desired position. Therefore, no mechanical brake may be required for holding the nacelle 106 at the desired position. Nevertheless, a mechanical brake can still be provided for the yaw system 200 in case of power failures. A mechanical brake may be provided for each motor 202. Alternatively, a mechanical brake may be provided for the plurality of motors 202.

In order to control the motors 202 in the different operation modes, the yaw system controller 208 may communicate with the at least one controller 204 which is coupled to the yaw system controller 208. The communication between the yaw system controller 208 and the at least one controller 204 can be carried out according to packet transmission protocol. The packet transmission protocol may include but is not limited to Internet protocol.

The yaw system controller 208 may transmit control information to at least one motor 202 of the plurality of motors 202 (i.e., to the controller 204 of the at least one motor 202). The at least one motor 202 may be controlled based on the control information. The yaw system controller 208 may determine the control information based on at least one of information representing a wind direction and a position of the nacelle 106. The control information may specify operation parameters for the at least one motor 202. The control information may include but is not limited to a torque of the motor 202 applied on the nacelle 106, a rotational speed of the motor 202 and a rotational direction of the motor 202. To obtain the information representing a wind direction, the yaw system controller 208 may be coupled to a sensor or a wind vane which measures the wind direction. To obtain the information representing a position of the nacelle 106, the yaw system controller 208 may be coupled to a sensor which measures a position of the nacelle 106.

A controller 204 of at least one other motor 202 may receive operation information from the controller 204 of the at least one motor 202. The at least one other motor 202 may be controlled based on the received operation information. In one embodiment, the operation information may include the control information. Therefore, at an initial stage, the plurality of the controllers 204 may communicate the control information from the yaw system controller 208 between one another and control the respective motor 202 according to the control information from the yaw system controller 208. The operation information may include but are not limited to a torque of the motor 202 applied on the nacelle 106, a rotational speed of the motor 202 and a rotational direction of the motor 202. The operational information may include real values specifying the torque in, for example, Nm and the rotational speed in, for example, number of rotations per minute, and may specify the rotational direction using a flag. The at least one controller 204 may transmit the operation information to the controller 204 of the at least one other motor 202 of the plurality of motors 202.

Further, during the operation of the yaw system 200, each controller 204 of the plurality of controllers 204 may communicate with the at least one other controller 204 to ensure that the torque applied on the nacelle 106 is equally shared among the plurality of motors 202. The communication between the respective controllers 204 of the plurality of motors 202 may be carried out according to packet transmission protocol. The packet transmission protocol may include but is not limited to Internet protocol.

Each controller 204 may have a message generation means for generating a message or a packet according to the packet transmission protocols. The generated message or packet may be sent to two or more other controllers 204 via broadcasting or multicasting. The generated message or packet may be sent to only one other controller 204 via unicasting. The generated message or packet may include a frequency and/or a current. A low frequency may indicate a small deviation from the wind direction. A high frequency may indicate a large deviation from the wind direction. The current may range between, for example, about 4 mA to about 20 mA. A current of about 12 mA may indicate no deviation from the wind direction. A current of about 20 mA may indicate a large deviation from the wind direction in a clockwise direction. A current of about 4 mA may indicate a large deviation from the wind direction in an anti-clockwise direction.

Each controller 204 may also request information from one or more other controllers 204 by sending a request message or packet to the one or more other controllers 204. Each controller 204 may send the request message or packet to a plurality of controllers 204 simultaneously or at different time intervals. Therefore, each controller 204 may also receive information from the plurality of controllers 204 simultaneously or at different time intervals.

To allow communication between the controllers 204, the controllers 204 are coupled to a communication network including but not limited to a local area network. Communication between the controllers 204 may also be carried out wirelessly via a wireless communication network.

In one embodiment, the operation information communicated between the controller 204 of the at least one motor 202 and the controller of the at least one other motor 202 may include information about an operational characteristic of the at least one motor 202. The operation information may also include information about an operational characteristic of the at least one other motor 202. For example, the controller 204 of a first motor 202 of the plurality of motors 202 is coupled to the controller 204 of a second motor 202 of the plurality of motors 202. The controller 204 of the first motor 202 may communicate with the controller 204 of the second motor 202 to receive information about an operational characteristic of the second motor 202. The controller 204 of the first motor 202 may control the first motor 202 based on the received information. Further, the controller 204 of the second motor 202 may communicate with the controller 204 of the first motor 202 to receive information about an operational characteristic of the first motor 202. The controller 204 of the second motor 202 is configured to control the second motor 202 based on the received information. The operational characteristic may include but are not limited to a torque of the motor 202 applied on the nacelle 106, a rotational speed of the motor 202 and a rotational direction of the motor 202. The operational characteristics of the first motor 202 and of the second motor 202 may include real values specifying the torque in, for example, Nm and the rotational speed in, for example, number of rotations per minute, and may specify the rotational direction using a flag. Therefore, during the operation of the yaw system 200, each controller 204 may send information about the operational characteristic of the corresponding motor 202 to at least one other controller 204. Each controller 204 may receive information about the operational characteristic of at least one other motor 202 from at least one other controller 204. Each controller 204 may thus control the respective motor 202 based on the information about the operational characteristic of at least one other motor 202 of the plurality of motors 202.

Communication of the information about an operational characteristic of the plurality of motors 202 can allow equal sharing of the torque applied on the nacelle 106 among the plurality of motors 202. For example, if one particular motor 202 applies a higher torque than the other motors 202 on the nacelle, the torque applied by that particular motor 202 can be adjusted by the corresponding variable torque drive 206. The rotational speed and/or the rotational direction of one motor 202 can also be adjusted if the rotational speed and/or the rotational direction of that particular motor 202 are different from that of the other motors 202. Further, communication between the controllers 204 of the respective motors 202 can allow a faster response of the yaw system 200 to yaw the nacelle 106 according to a change of the wind direction.

In one embodiment, the wind turbine 100 may include a wind turbine controller. The wind turbine controller is generally used to monitor the condition of the wind turbine 100 and collect statistics on an operation of the wind turbine 100. The wind turbine controller is also generally used to control a large number of switches, hydraulic pumps, valves, and motors within the wind turbine 100.

Figure 4A:
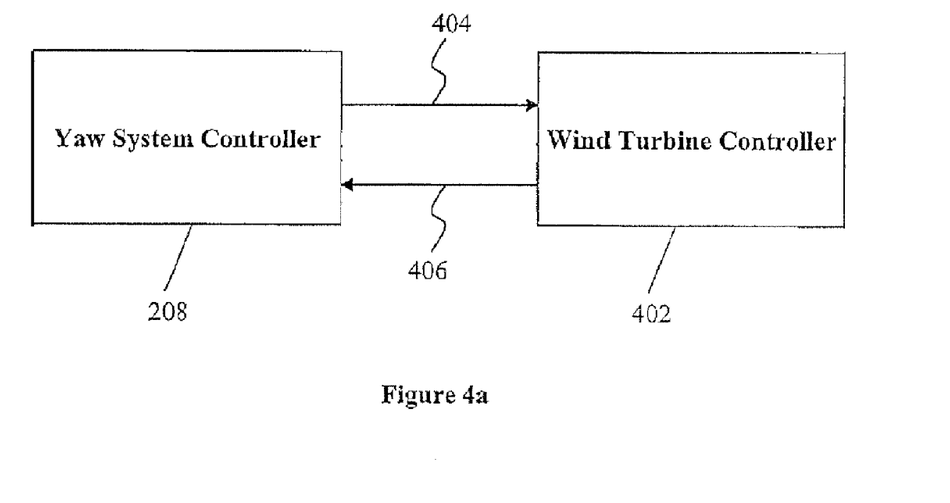
FIG. 4a shows a schematic diagram of a yaw system controller coupled to a wind turbine controller.

In one embodiment, as shown in FIG. 4a, the wind turbine controller 402 may be coupled to the yaw system controller 208. The yaw system controller 208 may be configured to operate independently from the wind turbine controller 402. That is, when the wind turbine controller 402 is faulty, the yaw system controller 208 is still able to yaw the nacelle 106.

Figure 4B:
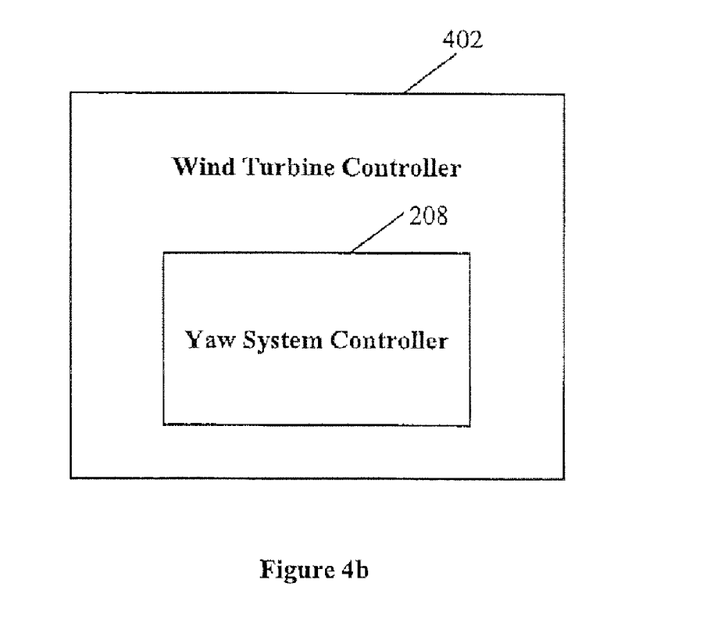
FIG. 4b shows a schematic diagram of a yaw system controller being a part of a wind turbine controller.

In another embodiment, as shown in FIG. 4b, the yaw system controller 208 may be part of the wind turbine controller 402.

There may be communication between the wind turbine controller 402 and the yaw system controller 208. The yaw system controller 208 may send a feedback signal 404 to the wind turbine controller 402. The wind turbine controller 402 may send a control signal 406 to the yaw system controller 208 to override an operation of the yaw system 200. For example, if the yaw system 200 is yawing the nacelle to a desired position, the wind turbine controller 402 may send a control signal 406 to the yaw system controller 208 to bring the nacelle 106 to a rest position and to start unwinding the twisted cable. If the yaw system 200 is yawing the nacelle 106 in a clockwise direction, the wind turbine controller 402 may send a control signal 406 to the yaw system controller 208 to yaw the nacelle 106 in an anti-clockwise direction instead, and vice versa. Alternatively, the yaw system 200 may start yawing the nacelle 106 at a rest position in a clockwise direction or in an anti-clockwise direction. The control signal 406 sent from the wind turbine controller 402 to the yaw system controller 208 may be manually inputted into the wind turbine controller 402.

Figure 4C:
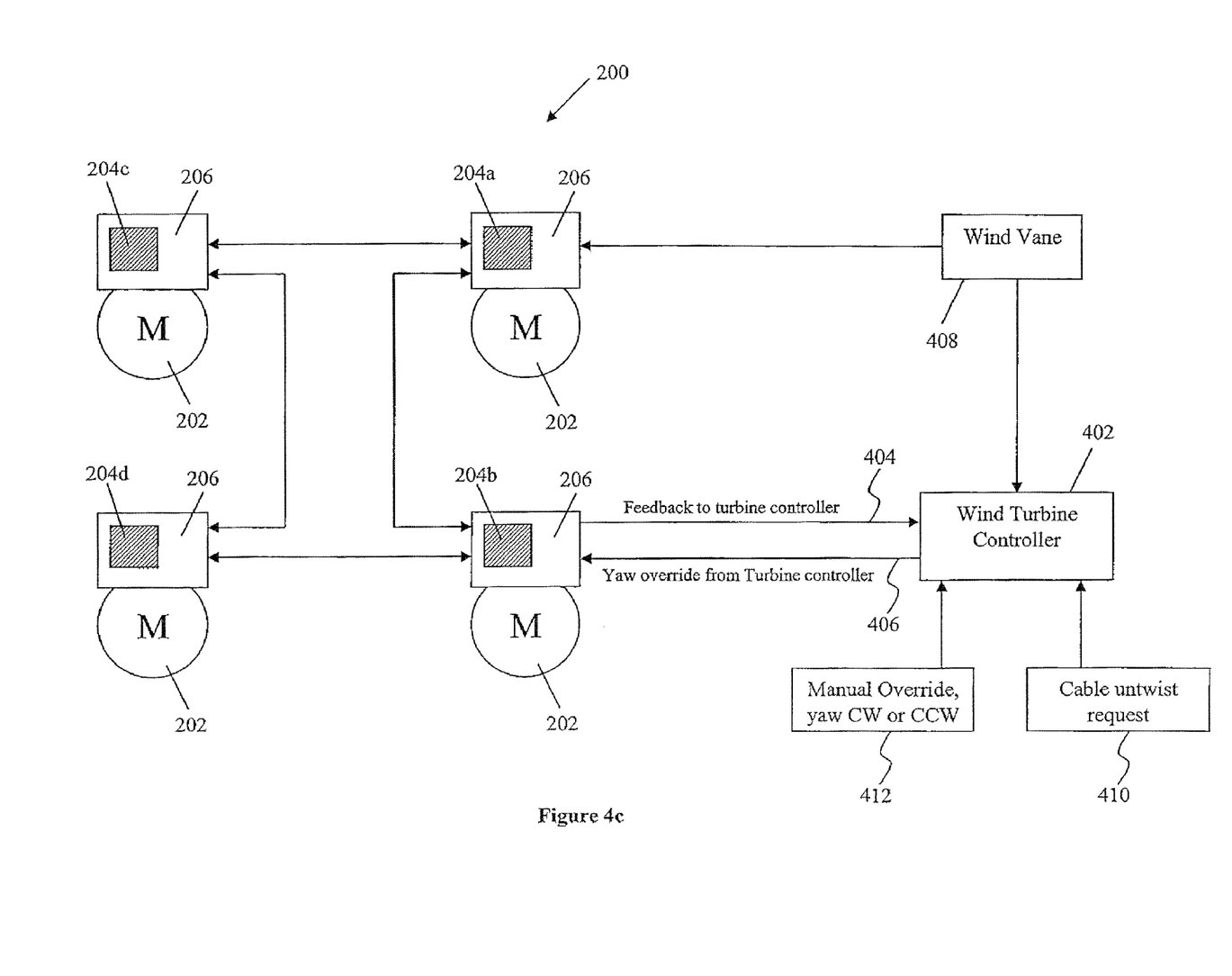
FIG. 4c shows a schematic diagram of another arrangement of a wind turbine controller and a yaw system controller.

FIG. 4c shows a schematic diagram of another arrangement of the wind turbine controller 402 and the yaw system controller 208. In this embodiment, a wind vane 408 is coupled to one controller 204a of the plurality of controllers 204 of the yaw system 200. The wind vane 408 is also coupled to the wind turbine controller 402. The wind turbine controller 402 is coupled to another controller 204b of the plurality of controllers 204 of the yaw system 200.

The controllers 204a, 204b may together perform the function of the yaw system controller 208. The controller 204a can receive information representing a wind direction from the wind vane 408. The controller 204b can send a feedback signal 404 to the wind turbine controller 402. The wind turbine controller 402 may send a control signal 406 to the controller 204b to override an operation of the yaw system 200. The controllers 204a, 204b may transmit information about an operational characteristic of the respective motors 202 and/or operation information specifying operation parameters for the respective motors 202 to the other controllers 204c, 204d.

In this embodiment, a control signal 410 to unwind the twisted cable and/or a control signal 412 to yaw the nacelle may be manually inputted into the wind turbine controller 402. When a control signal 410 is inputted into the wind turbine controller 402, the nacelle 106 may stop yawing. At a rest position of the nacelle 406, the yaw system 200 may start unwinding the twisted cable. When a control signal 412 is inputted into the wind turbine controller 402, the nacelle 106 which is at the rest position may start yawing in a clockwise direction or in an anti-clockwise direction. Alternatively, if the nacelle 106 was originally yawing in a clockwise direction, the nacelle 106 may start to yaw in an anti-clockwise direction according to the control signal 412, and vice versa.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A yaw system for a nacelle of a wind turbine, comprising:
- a plurality of motors, each motor being coupled to the nacelle for applying torque to the nacelle;
- a plurality of controllers, wherein the plurality of controllers comprises one controller for each motor of the plurality of motors, each controller being configured to control the respective motor and being coupled to at least one other controller to transmit operation information thereto; and
- a yaw system controller being configured to transmit control information to at least one controller of the plurality of controllers;
- wherein at least one of the controllers is configured to control the respective motor based on at least one of the control information and the operation information from the at least one other controller.

2. The yaw system of claim 1, wherein the yaw system controller is configured to determine the control information based on at least one of information representing a wind direction and a position of the nacelle, and to transmit the control information to at least one of the controllers.

3. The yaw system of claim 1, wherein the operation information includes the control information.

4. The yaw system of claim 1, wherein the operation information includes information about an operational characteristic of the motor of the at least one other controller.

5. The yaw system of claim 1, wherein the operation information comprises one or more of a group consisting of a torque, a rotational speed and a rotational direction.

6. The yaw system of claim 1, wherein the yaw system controller is at least one of the controllers or a separate unit coupled to at least one of the controllers.

7. The yaw system of claim 4, wherein the controller of a first motor of the plurality of motors is coupled to the controller of a second motor of the plurality of motors and the controller of the first motor is configured to communicate with the controller of the second motor to receive information about an operational characteristic of the second motor.

8. The yaw system of claim 7, wherein the controller of the first motor is configured to control the first motor based on the received information.

9. The yaw system of claim 7, wherein the controller of the second motor is configured to communicate with the controller of the first motor to receive information about an operational characteristic of the first motor and wherein the controller of the second motor is configured to control the second motor based on the received information.

10. The yaw system of claim 1, wherein the communication between the controllers is carried out according to packet transmission protocol.

11. The yaw system of claim 10, wherein the packet transmission protocol comprises Internet protocol.

12. The yaw system of claim 1, wherein each motor comprises a variable torque drive.

13. The yaw system of claim 12, wherein the variable torque drive of each motor comprises the controller of the motor.

14. The yaw system of claim 1, wherein the yaw system controller is configured to, in a first operation mode, control the plurality of motors to apply torque to the nacelle in a first rotation direction or in a second rotation direction simultaneously; and configured to, in a second operation mode, control at least the first motor of the plurality of motors to apply torque to the nacelle in the first rotation direction and to control at least the second motor of the plurality of motors to apply torque to the nacelle in the second rotation direction.

15. The yaw system of claim 14, wherein in the first operation mode, the yaw system is configured to move the nacelle in the first rotation direction or the second rotation direction such that a rotor with at least one blade coupled to the nacelle is moved according to a wind direction.

16. The yaw system of claim 14, wherein in the first operation mode, the yaw system is configured to unwind a cable at a rest position of the nacelle.

17. The yaw system of claim 14, wherein in the second operation mode, the yaw system is configured to generate a braking effect to keep the nacelle at a desired position.

18. The wind turbine yaw system of claim 1, wherein each motor is one or more of a group consisting of a direct current motor, a servo motor and a permanent magnet motor.

19. A wind turbine comprising a yaw system of claim 1.

* * * * *